US007793678B2

(12) United States Patent
Edwards et al.

(10) Patent No.: US 7,793,678 B2
(45) Date of Patent: Sep. 14, 2010

(54) METHOD AND APPARATUS FOR CONVERTER VALVE

(75) Inventors: William A. Edwards, Selma, TX (US); Frank Carreño, Converse, TX (US); Michael J. Riley, Johns Creek, GA (US)

(73) Assignee: Lancer Partnership, Ltd, San Antonio, TX (US)

( * ) Notice: Subject to any disclaimer, the term of this patent is extended or adjusted under 35 U.S.C. 154(b) by 382 days.

(21) Appl. No.: 11/981,608

(22) Filed: Oct. 31, 2007

(65) Prior Publication Data

US 2009/0107559 A1 Apr. 30, 2009

(51) Int. Cl.
*F16K 11/02* (2006.01)
*B67D 1/08* (2006.01)

(52) U.S. Cl. ................ 137/15.21; 137/270; 137/625.4; 137/553; 137/605; 222/1; 222/145.1; 222/129.1

(58) Field of Classification Search ............. 137/625.4, 137/454.2, 551, 553, 15.21, 270, 269, 602, 137/603, 605; 222/145.1, 129.1, 1
See application file for complete search history.

(56) References Cited

U.S. PATENT DOCUMENTS 998,843 A * 7/1911 Dunn ......................... 137/269
2,252,501 A * 8/1941 Foresman ................ 137/625.4
3,581,770 A * 6/1971 Cerrato .................... 137/625.4
4,597,404 A * 7/1986 Van Marcke ................... 137/1
5,582,222 A * 12/1996 Riall .......................... 141/346
5,881,922 A * 3/1999 Hawkins et al. .......... 222/144.5
6,408,868 B2 * 6/2002 Rondreux et al. ........... 137/270

* cited by examiner

*Primary Examiner*—Kevin L Lee
(74) *Attorney, Agent, or Firm*—Christopher L. Makay

(57) ABSTRACT

A converter valve allows product dispenser operator to change from a first fluid source to a second fluid source without fluid crossover. The converter valve includes a first port in fluid communication with a dispense point, a second port in fluid communication with a first fluid source having a first fluid, and a third port is in fluid communication with a second fluid source having a second fluid. The converter valve includes a passage between the first and second ports, and a plug in fluid communication with third port. The second and third ports of the converter valve are disposed symmetrically about the first port, and, accordingly, the converter valve is rotatable about the first port. As such, the converter valve delivers the first fluid to the dispense point, and delivers the second fluid through the passage to the dispense point when the converter valve is rotated.

36 Claims, 10 Drawing Sheets

METHOD AND APPARATUS FOR CONVERTER VALVE

BACKGROUND OF THE INVENTION

1. Field of the Invention

The present invention relates to dispensing equipment and, more particularly, but not by way of limitation, to methods and an apparatus for preventing fluid and or material crossover in a dispenser.

2. Description of the Related Art

In the areas of dispensing, dispensers with limited reconfiguration capability are being utilized in a changing marketplace. New trend flavors and refreshment types are continuously being pushed into the marketplace and retail location owners attempt to dispense the latest products through older dispensers.

Most new beverage products may be of a similar consistency and viscosity to the older products, and, therefore, are easily adaptable to existing or legacy beverage equipment. However, problems arise when a concentrate line in a beverage dispenser is utilized interchangeably to dispense two varying types of product, particularly if one product can be classified as "pungent." "Pungent" products leave a residue or odor that is not easily removed by cleaning in the concentrate line. As such, taste problems may occur if the product currently utilizing the pungent concentrate line is not able to mask the residual odor or taste.

Previous attempts to provide a switchable valve in communication with two distinct product lines have met with varying results, because of the varying pressures associated with carbonated diluents, plain water diluents, and the product concentrates. Illustratively, the higher pressures ultimately force a crossover of fluid through o-ring seals, and the like, thereby causing other forms of distaste.

Accordingly, an apparatus and product dispenser including a valve that prevented crossover between beverage product and diluent lines would be beneficial to dispenser manufacturers, retailers, and consumers.

SUMMARY OF THE INVENTION

In accordance with the present invention, a converter valve and receiver block arrangement enables different fluids to be introduced to a dispense point through an inlet passage coupled with corresponding port plugs that prevent flow of alternative fluids in the receiver block.

The converter valve allows a dispenser operator to change from a first fluid source to a second fluid source without fluid crossover. The converter valve includes a first port in fluid communication with a dispense point, a second port in fluid communication with a first fluid source having a first fluid, and a third port is in fluid communication with a second fluid source having a second fluid. The converter valve includes a passage between the first and second ports, and a plug in fluid communication with third port. The second and third ports of the converter valve are disposed symmetrically about the first port, and, accordingly, the converter valve is rotatable about the first port. As such, the converter valve delivers the first fluid to the dispense point, and delivers the second fluid through the passage to the dispense point when the converter valve is rotated.

The converter valve may be utilized to deliver diluents, single strength flavors, or concentrates without fluid crossover issues. The converter valve further provides the ability to dedicate product lines to "pungent" products, thereby eliminating residual odors and flavors.

It is therefore an object of the present invention to provide a converter valve having a passage and a plug for adapting to a first fluid source and a second fluid source.

It is a further object of the present invention to provide a fluid dispenser utilizing a converter valve to provide interchangeability between the first fluid and the second fluid, and block the flow from fluid passages not selected.

It is still further an object of the present invention to provide a device that eliminates fluid crossover in the switching device.

It is still yet further an object of the present invention to provide a method for changing product lines delivering product to a dispense point.

It is still yet further an object of the present invention to provide a reference or identification method to enable users to detect which inlet port is connected to the outlet passage.

Still other objects, features, and advantages of the present invention will become evident to those of ordinary skill in the art in light of the following. Also, it should be understood that the scope of this invention is intended to be broad, and any combination of any subset of the features, elements, or steps described herein is part of the intended scope of the invention.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. It is further to be understood that the figures are not necessarily to scale, and some features may be exaggerated to show details of particular components or steps.

Figure 1:
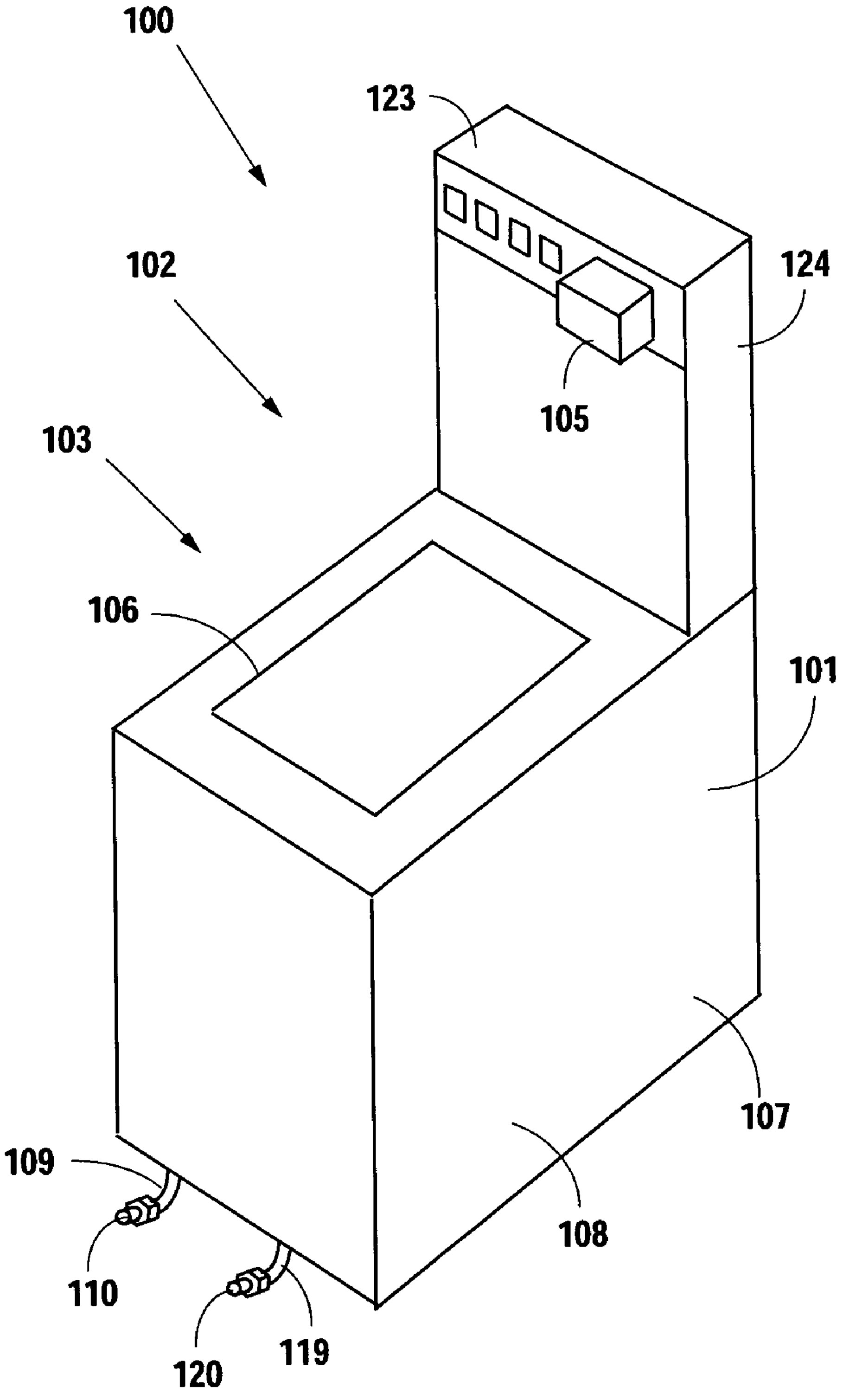
FIG. 1 provides a perspective view of a dispenser according to the preferred embodiment.
Figure 2:
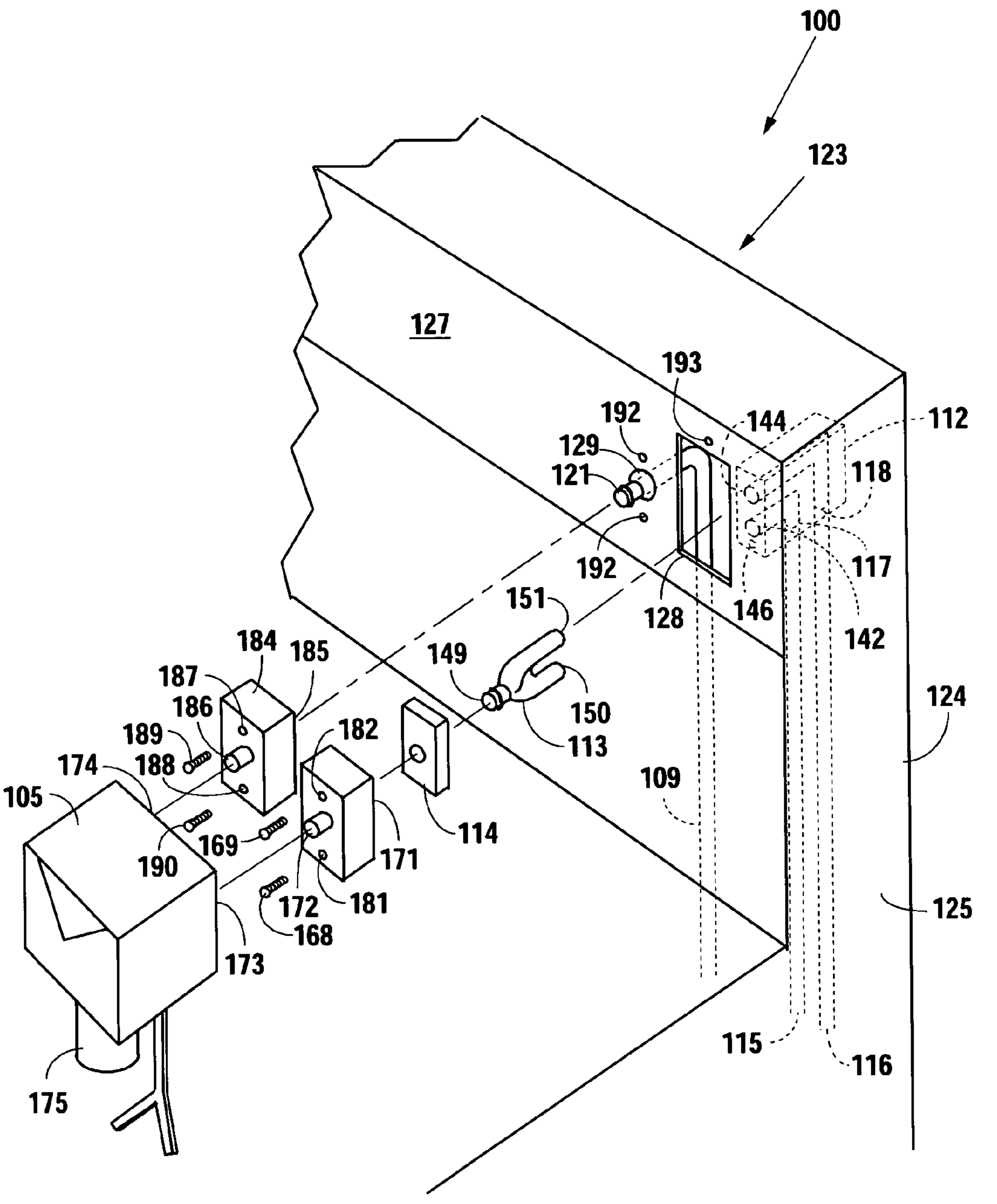
FIG. 2 provides an exploded view of the dispenser according to the preferred embodiment.
Figure 3A:
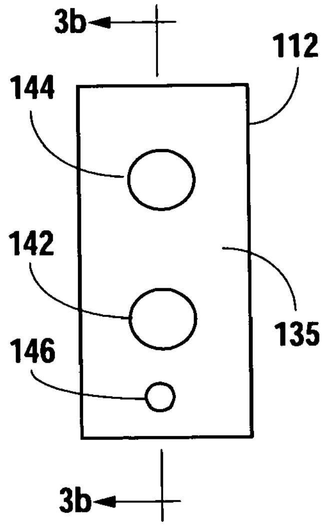
FIG. 3*a* provides a front view of a receiver block according to the preferred embodiment.
Figure 3B:
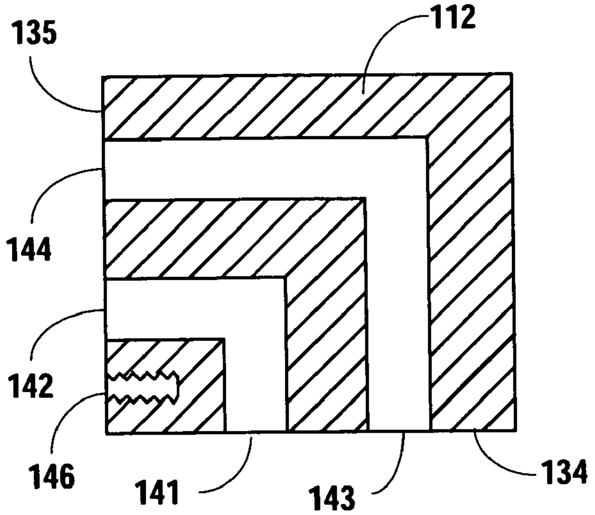
FIG. 3*b* provides a section view of the receiver block according to the preferred embodiment.
Figure 3C:
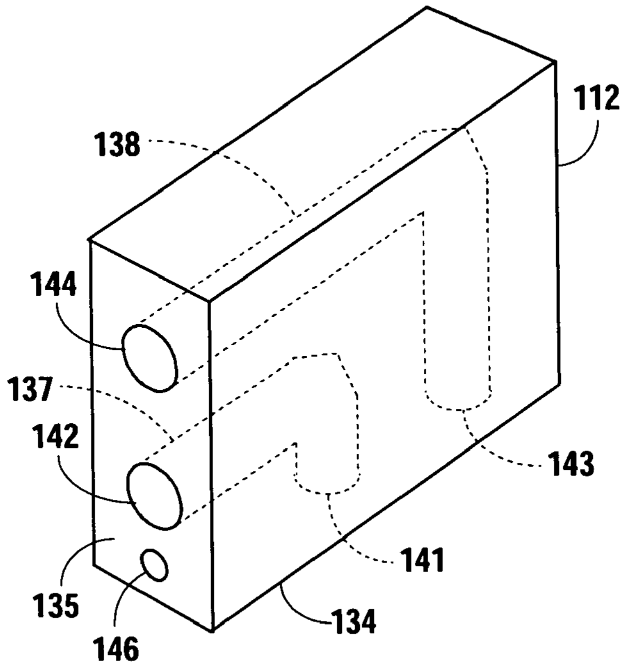
FIG. 3*c* provides a perspective of the receiver block according to the preferred embodiment.
Figure 4A:
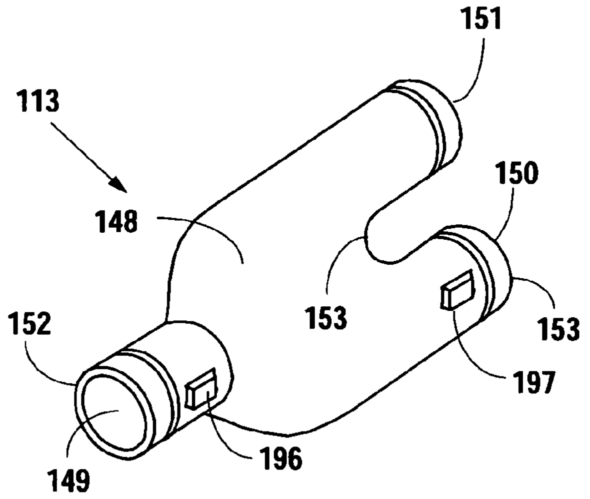
FIG. 4*a* provides a perspective view of a converter valve according to the preferred embodiment.
Figure 4B:
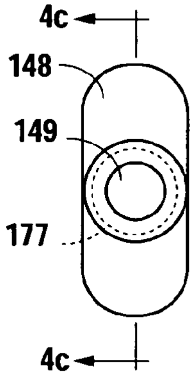
FIG. 4*b* provides a front view of a converter valve according to the preferred embodiment.
Figure 4C:
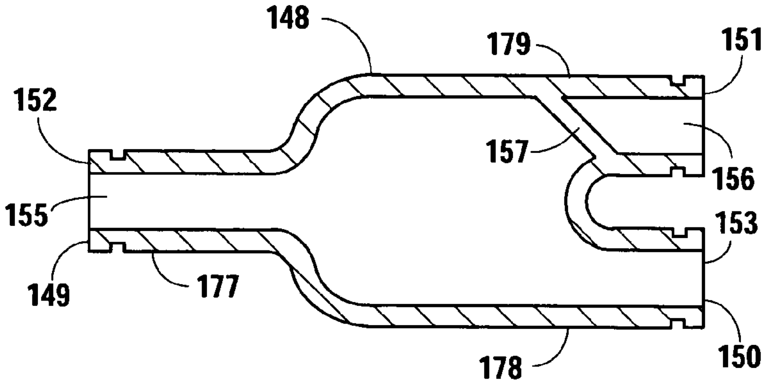
FIG. 4*c* provides a section view of a converter valve according to the preferred embodiment.
Figure 5A:
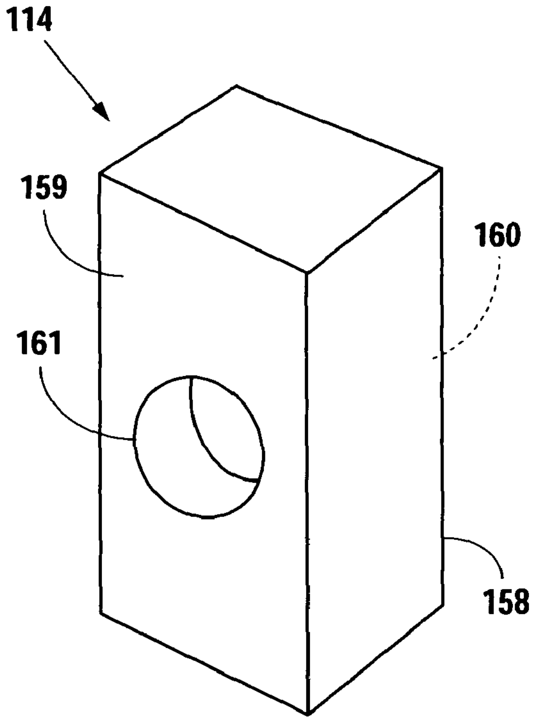
FIG. 5*a* provides a perspective view of an insulator block according to the preferred embodiment.
Figure 5B:
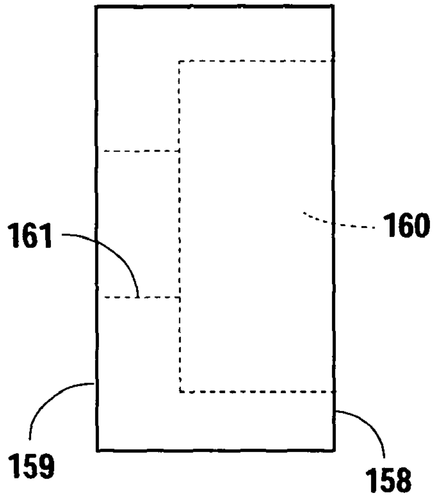
FIG. 5*b* provides a side view of the insulator block according to the preferred embodiment.
Figure 5C:
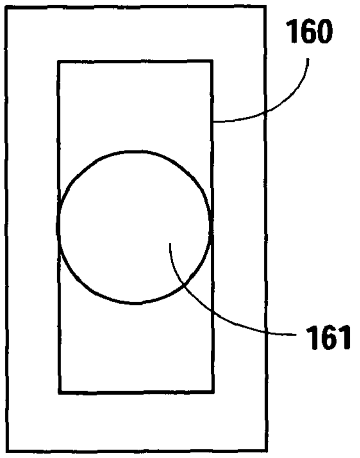
FIG. 5*c* provides a rear view of the insulator block according to the preferred embodiment.

As shown in FIGS. 1-2, a dispenser 100 includes a housing 101 having a diluent circuit 102, a conditioning device 108, and a carbonating device 107. The dispenser 100 may further include at least one concentrate circuit 103. The housing 101 may further include a tower section 123 disposed atop the housing 101, wherein dispense points 105 are secured to the tower section 123, and may deliver product, diluent, or a mixture thereof, in conditioned or unconditioned forms. In this specific example, the conditioning device 108 is an ice-cooled cold plate, however, one of ordinary skill in the art will recognize that other forms of conditioning are available, and may be utilized in combination with this invention. The housing 101 still further includes a storage chamber 106 for storing a product, namely ice. One of ordinary skill in the art will recognize that the storage chamber 106 may be disposed above the cold plate, such that ice coming into contact with an upper surface of the cold plate cools the cold plate.

In this invention, the term dispenser is defined as a device that delivers at least one product. The product or products may take a variety of forms, including single strength product, concentrated product, diluents, and the like, for use or consumption. Alternatively, the products may be mixed with a diluent for reconstitution and delivery through a dispense point. Illustratively, in this particular example of the first embodiment, the dispenser 100 is a beverage dispenser that delivers beverage products, including diluents for mixing with a concentrate. While this embodiment is shown with a beverage dispenser, one of ordinary skill in the art will recognize that this invention is applicable to other dispensers. In this disclosure, the term housing is defined as any type housing known in the art of product dispensing, including refrigerated dispensers, ice cooled dispensers, and ambient dispensers.

The diluent circuit 102 includes at least one diluent line 109 extending from an inlet 110 connected to a diluent source to the dispense point 105 typically disposed on the tower section 123. One of ordinary skill in the art will recognize that the diluent circuit 102 may be split to provide the capability to deliver a "plain" diluent and a "carbonated" diluent at the dispense point. In this invention, the diluent line 109 splits to create a first branch 115 and second branch 116. In this specific example, the first branch 115 delivers plain diluent, and the second branch 116 delivers carbonated diluent. Both branches 115-116 pass through the conditioning device 108 for chilling. One of ordinary skill in the art will further recognize that a branch of the diluent line 109 may bypass the conditioning device 108 to deliver ambient diluent to a dispense point 105, and accordingly, this invention may be utilized with branches not passing through the conditioning device 108. The first branch 115 makes multiple passes through the conditioning device 108, exits the conditioning device 108, and extends upwards toward the tower section 123. The second branch 116 makes multiple passes through the conditioning device 108, enters the carbonating device 107, exits the conditioning device 108 and the carbonating device 107, and extends upward to the tower section 123. Accordingly, an outlet 117 for the first branch 115 and an outlet 118 for the second branch 116 are disposed at a predetermined spacing suitable for attachment.

The dispenser 100 further includes a concentrate circuit 103 in this configuration, for mixing with the diluent. As shown in FIGS. 1-2, the concentrate circuit 103 includes a concentrate line 119 having an inlet 120 and an outlet 121. In this specific example, the concentrate line 119 passes through the conditioning device 108 for chilling, in similar fashion to the first branch 115, and, therefore, delivers a chilled concentrate. The inlet 120 is disposed at a lower front of the product dispenser 100, and is in communication with a concentrate source. The concentrate line 119 passes through the conditioning device 108 and extends upward in similar fashion to the first and second branches 115-116 of the diluent circuit 102. The concentrate line 119 changes direction within the tower section 123 to mate with a faucet plate 127.

The tower section 123 is disposed on an upper rear portion of the housing 101, and includes a tower shell 124, at least one receiver block 112, and an insulation 125 disposed between the tower shell 124 and the product lines and the receiver block 112. In this specific example, the tower shell 124 is substantially rectangular and is securable to the housing 101. In particular, the tower shell 124 is of a hollow metal or plastic construction, such that the tower components are protected and insulated.

The receiver block 112 is of a polyhedron shape. In this particular example, the receiver block 112 is rectangular, and includes a first engagement face 134 and a second engagement face 135 disposed approximately ninety degrees from each other. The receiver block 112 further includes a first passage 137 and a second passage 138 extending from the first engagement face 134 to the second engagement face 135. Accordingly, the first passage 137 includes a first inlet 141 and a first outlet 142, and the second passage 138 includes a second inlet 143 and a second outlet 144. The inlets 141 and 143 are disposed in positions complementary to the arrangement of the outlets 117-118 of the first branch 115 and the second branch 116 of the diluent circuit 102. The outlets 142 and 144 are similarly aligned, but are disposed at a spacing complementary to ports of the mating converter valve 113. The receiver block 112 further includes at least one restraint aperture 146 disposed on the second engagement face 135. The restraint aperture 146 is disposed in alignment with the outlets 142 and 144. While the inlets 141 and 143 have been shown to be in alignment with the outlets 117-118 of the first and second branches 115-116, one of ordinary skill in the art will recognize that the locations of the inlets 141 and 143 are not required to be placed in a same pattern as the outlets 142 and 144 of the second engagement face 135. In this specific example, the receiver block 112 is machined stainless steel to prevent contamination of contacting fluids; however, one of ordinary skill in the art will recognize that other materials suitable for food contact are possible.

The converter valve 113 includes a body 148, a first end 152, and a second end 153. The first end 152 of the converter valve 113 includes a first protrusion 177 having a first port 149, and the second end 153 includes a second protrusion 178 having a second port 150 and a third protrusion 179 having a third port 151. The first through third ports 149-151 are adaptable to fluid connections. In this particular example, the first through third ports 149-151 are outfitted with at least one o-ring groove to accept and contain o-rings, thereby creating part of a Dole fitting assembly. The converter valve 113 further includes a passage 155 extending from the first port 149 to the second port 150, and a plug 156 is created by a wall 157 disposed between the plug 156 and the passage 155. Accordingly, fluids may move from the first port 149 to the second port 150, as well as in reverse, and fluids entering the third port 151 cease to flow at the wall 157.

The converter valve 113 further includes a first marker 196 and a second marker 197. The first and second markers 196-197 are disposed on the body 148. In this specific example, the first and second markers 196-197 are protrusions. The first marker 196 is disposed in proximity to the first port 149, and the second marker 197 is disposed in proximity to the second port 150. The first and second markers 196-197 provide visual demarcation of the ports in fluid communication with the passage 155 of the converter valve 113, thereby providing visual reference features for users use in determining the position of the passage 155 when the converter valve 113 is installed.

The insulator block 114 is a polyhedron, in this example rectangular in shape, and includes a first end 158 and a second end 159. The first end 158 includes a cavity 160 and the second end 159 includes an aperture 161 in alignment with the cavity 160. In this specific example, the cavity 160 is of a width identical to a diameter of the aperture 161, such that objects passing through the aperture 161 would also pass through cavity 160, and a height of the cavity 160 is larger than the diameter of the aperture 161, such that the cavity 160 includes a cross section larger than a cross section of the aperture 161. The insulator block 114 is of a closed cell foam construction or other suitable material with appropriate thermal conductivity characteristics. Illustratively, the insulator block 114 in this specific example is formed from polyethylene.

The faucet plate 127, well known in the industry, is disposed in a horizontal orientation along an upper edge of the tower section 123, and secured to the tower shell 124. The faucet plate 127 includes at least one insulator block relief 128. The insulator block relief 128 is of a size complementary to a height and width of the insulator block 114, such that the insulator block 114 may pass through insulator block relief 128 when properly oriented. The faucet plate 127 further includes at least one product line aperture 129 disposed in alignment with the registration block relief 128 for receiving the concentrate line 119.

The at least one back block 104 is commonly known in the industry, and includes an inlet 171, an outlet 172, and first and second mounting apertures 181-182. The back block 104 may further include a shut off valve that may be activated to stop the flow of diluent through the back block 104, thereby allowing a dispense point 105 to be removed without depressurizing the entire dispenser 100. In this invention, the inlet 171 of the back block 104 is adaptable to the first port 149 of the converter valve 113, and the outlet 172 is a protrusion of a size complementary to an inlet 173 of the dispense point 105. The mounting apertures 181-182 pass through the back block 104, such that fasteners 168-169 passing through the mounting apertures 181-182 may connect to the faucet plate 127 or other suitable structure.

A second back block 184 is required for mating to the outlet 121 of the concentrate line 119, and the dispense point 105. The second back block 184 is of a similar construction to the first back block 104, and includes an inlet 185, an outlet 186, and mounting apertures 187-188. The second back block 184 delivers concentrate from the outlet 121 to the dispense point 105.

One of ordinary skill in the art will recognize that the fluid connections between the mating components require sealing through o-rings, or other suitable types of fluid connections.

The at least one dispense point 105 may be any form of dispensing valve known in the industry for dispensing teas, waters, carbonated beverages, juices, and the like. One of ordinary skill in the art will recognize that the dispense points 105 may be changed with a product change, if so desired. In this simplest embodiment, the at least one dispense point 105 includes the diluent inlet 173, a concentrate inlet 174, and an outlet 175, whereby the dispense point 105 delivers product and diluent from the inlets 173-174 to the outlet 175. One of ordinary skill in the art will recognize that dispense points including multiple delivery passages are possible.

On assembly, the conditioning device 108, including the diluent line 109 and the carbonating device 107, are placed into the housing 101, such that the diluent inlet 110 is disposed at a front of the housing 101, and the outlets 117-118 are disposed within the tower section 123. One of ordinary skill in the art will recognize that an upper surface of the conditioning device 108 may form a floor of the storage chamber 106 to allow ice to come into contact with the upper surface, thereby cooling the conditioning device 108. Next, the receiver block 112 is secured to the outlets 117-118 of the first and second branches 115-116 of the diluent circuit 102. On further assembly, the outlet 117 of the first branch 115 is connected to the first inlet 141 of the receiver block 112, and the outlet 118 of the second branch 118 is connected to the second inlet 143 of the receiver block 112. In this specific example, the outlets 117-118 are welded to the receiver block 112. However, one of ordinary skill in the art will recognize that other forms of connection are possible. Upon installation, the outlets 142 and 144 of the receiver block 112 are disposed in alignment with the receiver block relief 128 of the faucet plate 127. Once properly aligned, the tower section 123 is filled with expanding foam to fill voids and permanently locate the receiver block 112 in place. One of ordinary skill in the art will recognize that a core may be utilized to create a passage within the insulation material in the tower section 123. In this particular example, a core is utilized to provide clearance from the registration block relief 128 through to the second engagement face 135 of the receiver block 112, thereby providing a clear passage to the second engagement face 135 and the outlets 142 and 144.

Upon further installation, the ports 149-151 of the converter valve 113 are outfitted with o-rings for sealing purposes, and the second end 153 of the converter valve 113 is then inserted through receiver block relief 128, such that the second protrusion 178 enters the first outlet 142 and the third protrusion 179 is placed into the second outlet 144 of the receiver block 112. In this specific example, the protrusions 177-179 are outfitted with Dole fittings for reconfiguration purposes; however, one of ordinary skill in the art will recognize that other forms of connection are possible. The insertion of the second protrusion 178 into the first outlet 142 of the receiver block 112 places the second port 150 into communication with the first branch 115 of the housing 101, and the insertion of the third protrusion 151 into the second outlet 144 places the third port 151 in communication with the second branch 116, and plugs the second branch 116 of the diluent circuit 102. At this point, the first protrusion 149 is disposed substantially centrally within the registration block relief 128 and protrudes through the registration block relief 128 a predetermined amount to engage the inlet 171 of the back block 104.

The insulator block 114 is then inserted into the void around the converter valve 113 in the installed position to insulate the converter valve 113. The first end 158 of the insulator block 114 is inserted over the first protrusion 177, such that the first protrusion 177 passes through the aperture, and the insulator block 114 fills the void disposed around the converter valve 113, thereby providing insulatory properties to the converter valve 113.

The back block 104 is then installed onto the faucet plate 127 and the converter valve 113 by placing the inlet 171 of the back block 104 over the first protrusion 177, and securing the back block 104 in place. In this particular example, a mounting fastener 168 is placed into the mounting aperture 181, passes through an aperture in the faucet plate 127, and secures to the restraint aperture 146 disposed in the second engagement face 135 of the receiver block 112. The mounting fastener 169 passes through the mounting aperture 182 and secures to a restraint aperture 193 disposed within the faucet plate 127. Upon tightening, the back block 104 is secured to the receiver block 112 and the faucet plate 127, thereby trapping the converter valve 113 between the receiver block 112 and the back block 104.

The second back block 184 is installed onto the faucet plate 127 and the concentrate outlet 121 by placing the inlet 185 of the back block 184 over the outlet 121 and placing fasteners 189-190 through the mounting apertures 187-188 to engage restraint apertures 192 disposed within the faucet plate 127. Upon tightening, the second back block 184 is secured to the faucet plate 127 and the concentrate outlet 121.

Next, the dispense point 105, well known in the industry, is secured to the back block 104 utilizing means commonly known, such that the inlet 173 of dispense point 105 is fluidly connected to the outlets 172 and 186 of the back blocks 104 and 184.

In use, the diluent circuit 102 is pressurized, thereby forcing diluent through the diluent line 109, and first and second branches 115-116. In this particular example, the first branch 115 enters the conditioning device 108 for chilling, and the second branch 116 enters the conditioning device 108 in route to the carbonating device 107. Upon exiting the carbonating device 107, the diluent disposed within the second branch 116 is carbonated and at a higher pressure than the first branch 115. In this particular example, the first branch 115 exits the conditioning device 108 and extends to the first inlet 141 of the receiver block 112, thereby extending the first branch 115 through the first passage 137 of the receiver block 112. As the second protrusion 150 of the converter valve 113 is connected to the first outlet 142 of the first passage 137, the first branch 115 is further extended through the passage 155 of the converter valve 113, and to the inlet 171 of the back block 104 for delivery to the dispense point 105.

Similarly, the second branch 116 of the diluent circuit 102 exits the carbonating device 107 and the conditioning device 108, extends upward, and mates with the second inlet 143 of the receiver block 112, thereby extending the second branch 116 to the second passage 138. As the third protrusion 179 of the converter valve 113 is connected to the second outlet 144 of the receiver block 112, the second branch 116 is extended to the plug 156 of the converter valve 113 and stops at the wall 157. Accordingly, the second branch 116 is terminated at the plug 156.

In this particular configuration, the first branch 115 extends from the diluent source to the dispense point 105, and the second branch 116 extends from the diluent source to the plug 156 of the converter valve 113. The plain diluent moves from the diluent source to through the conditioning device 108, through the first branch 115, through the second passage 138 of the receiver block 112, and through the passage 155 of the converter valve 113. The carbonated diluent moves from the diluent source to through the carbonating device 107 disposed within the conditioning device 108, through the second passage 138 of the receiver block 112, through the third port 151 of the converter valve 113.

One of ordinary skill in the art will recognize that the second and third protrusions 178 and 179 are disposed symmetrically from the first protrusion 177. The symmetry of the protrusions of the second end 153 of the converter valve 113 provides the ability to move the converter valve 113 from a first position to a second position by removing and reinstalling the converter valve 113 in a rotated position. Illustratively, in this specific example, the converter valve 113 is rotated one hundred and eighty degrees about an axis of the first protrusion 177, and is reinserted into the receiver block 112 such that the plug 156 and the passage 155 to are disposed in opposite branches of the diluent circuit 102. Accordingly, either the first branch 115 or the second branch 116 is always plugged when the converter valve 113 is fully installed and suitably restrained. While this specific embodiment has been shown to rotate one hundred and eighty degrees to align with a different outlet of the receiver block 112, one of ordinary skill in the art will recognize that virtually any degree of rotation may be utilized, dependent upon the locations of the outlets disposed within the receiver block 112. One of ordinary skill in the art will recognize that one of the objectives in this invention to allow passage of a single fluid and plug any remaining outlets of an outlet pattern. In this particular example, it is preferred to remove the converter valve 113, rotate the converter valve 113, and reinsert the converter valve 113. However, this invention is not limited to rotation of the converter valve 113, and, therefore, a receiver block removed, rotated to desired point, and reinstalled onto the ports of a converter valve, is within the scope of this invention.

Figure 6:
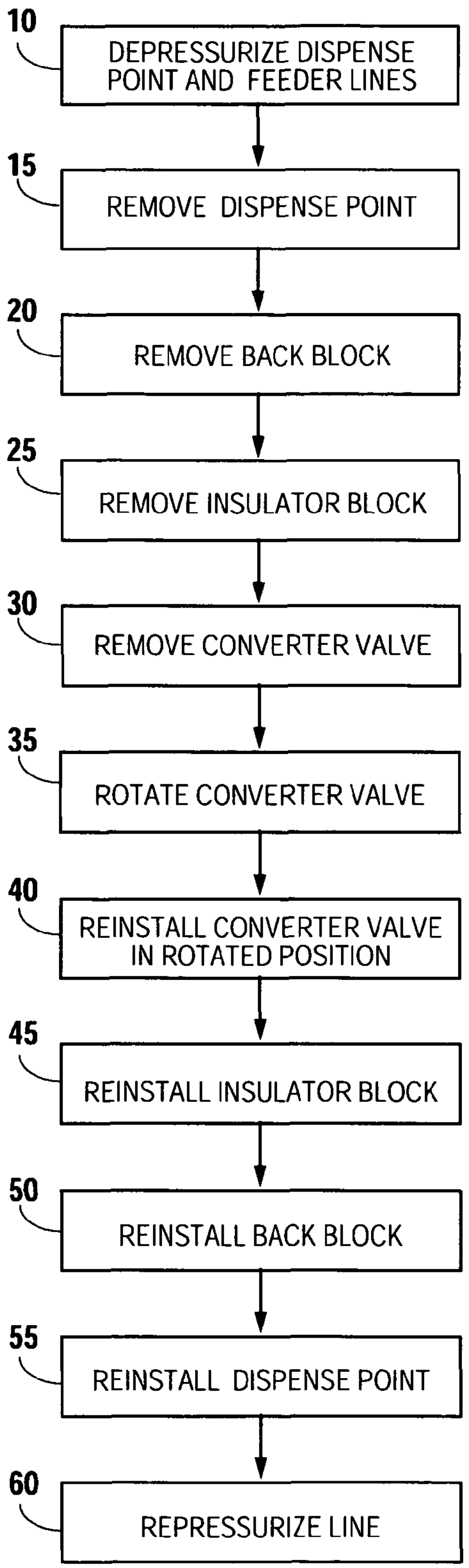
FIG. 6 provides a flowchart illustrating the method steps of switching from a first product line to a second product line according to the preferred embodiment.

FIG. 6 provides a flowchart illustrating the method steps for switching from a first branch 115 to a second branch 116 of the diluent circuit 102. The process commences with step 10, wherein an operator must depressurize both branches to prevent the propulsion of fluid during removal of the converter valve 113. Step 15 provides for the operator removing the dispense point 105 to gain access to the back block 104. Step 20 provides for the operator removing the back block 104 by removing fasteners 168-169, and step 25 requires that the operator remove the insulator block 114, thereby gaining access to the converter valve 113. In step 30, the operator removes the converter valve 113 situated in a first position, and step 35 provides for the operator rotating the converter valve 113 from the first position to a second position. Step 40 provides for the operator reinstalling the converter valve 113 in the second position. In step 45, the operator reinstalls the insulation block 114, and then the operator reinstalls the back block 104, step 50. Step 55 provides for reinstalling the dispense point 105. Step 60 provides for the operator repressurizing, and possibly removing gases from the branches leading to the dispense point 105. At this point, the operator is able to dispense a beverage by activating the dispense point 105.

One of ordinary skill in the art will recognize that the first and second branches delivering varied types of diluent may be utilized in combination with the concentrate circuit 103. One of ordinary skill in the art will further recognize that a concentrate disposed within the concentrate line 119 may be conditioned through various methods, including passing through the conditioning device 108 in similar fashion to the diluent circuit 102, or may be utilized to deliver ambient temperature concentrates by passing through the conditioning device 108. One of ordinary skill in the art will still further recognize, in this configuration, a single diluent is delivered to the dispense point 105 for mixing with the concentrate.

Figure 7:
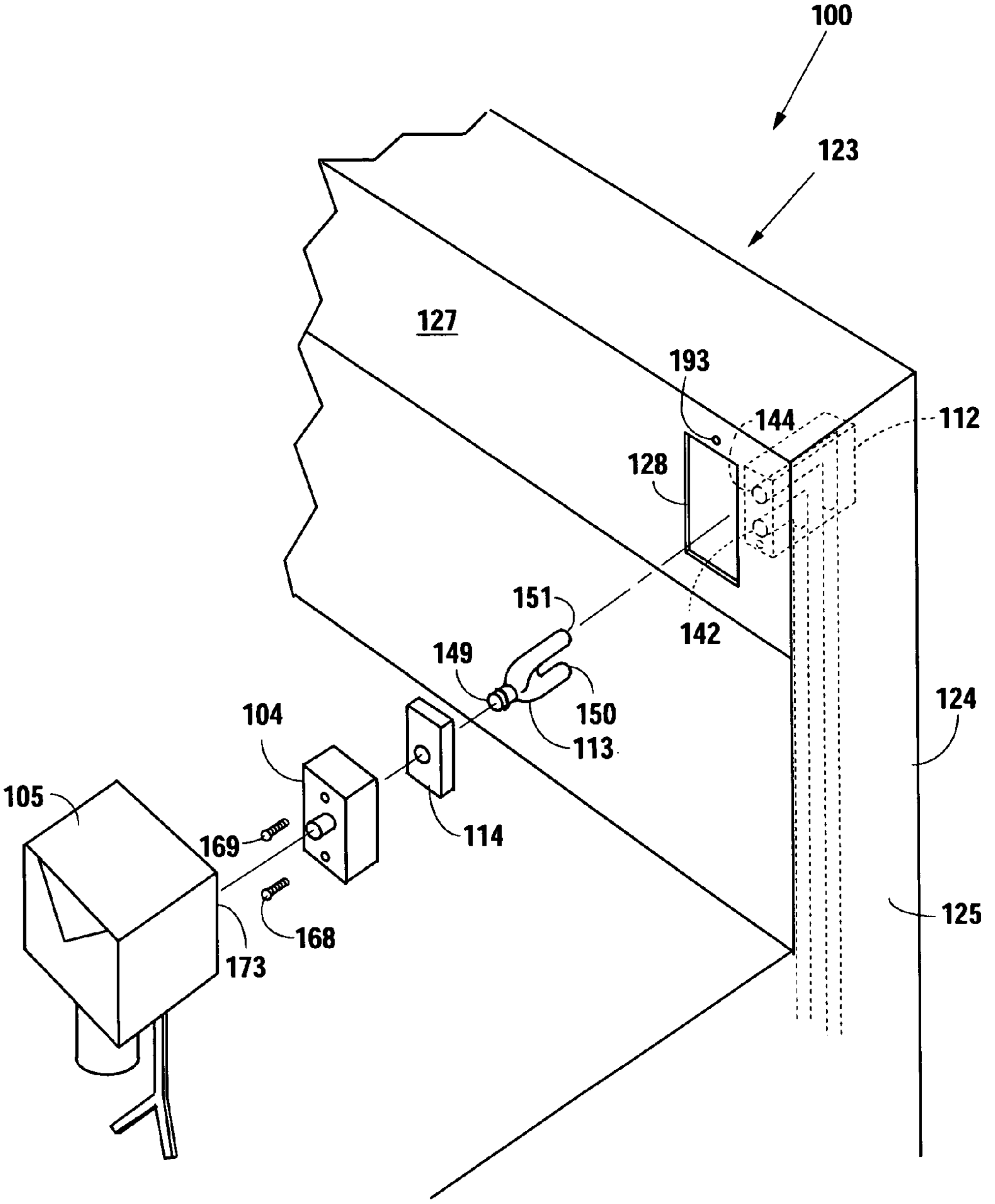
FIG. 7 provides an exploded view of the dispenser according to an alternative embodiment.

While this invention has been shown with a first branch 115 and a second branch 116 of a diluent circuit 102, one of ordinary skill in the art will recognize that the first branch 115 and the second branch 116 may be representative of separate concentrate circuits, such that an operator may switch from delivering concentrate from a first concentrate source to delivering a second concentrate from a second concentrate source, as shown in FIG. 7.

One of ordinary skill in the art will readily recognize that the receiver block 112 and converter valve 113 may be utilized with branches of a diluent circuit 102, independent concentrate circuits, or any combination thereof, to provide the ability to swap product flow to a dispense point within a product dispenser.

Figure 8A:
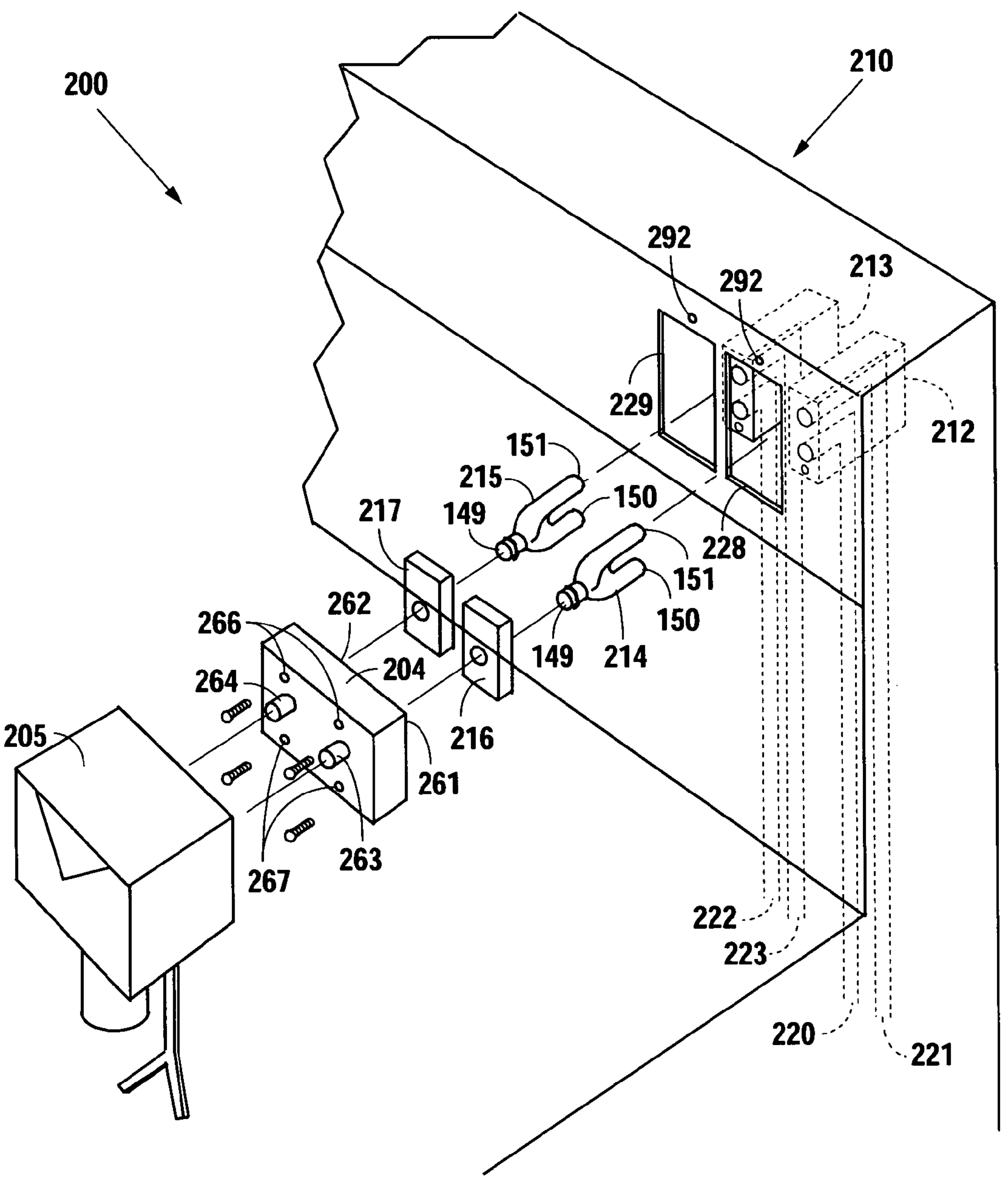
FIG. 8*a* provides an exploded view of a dispenser according to a second embodiment.
Figure 8B:
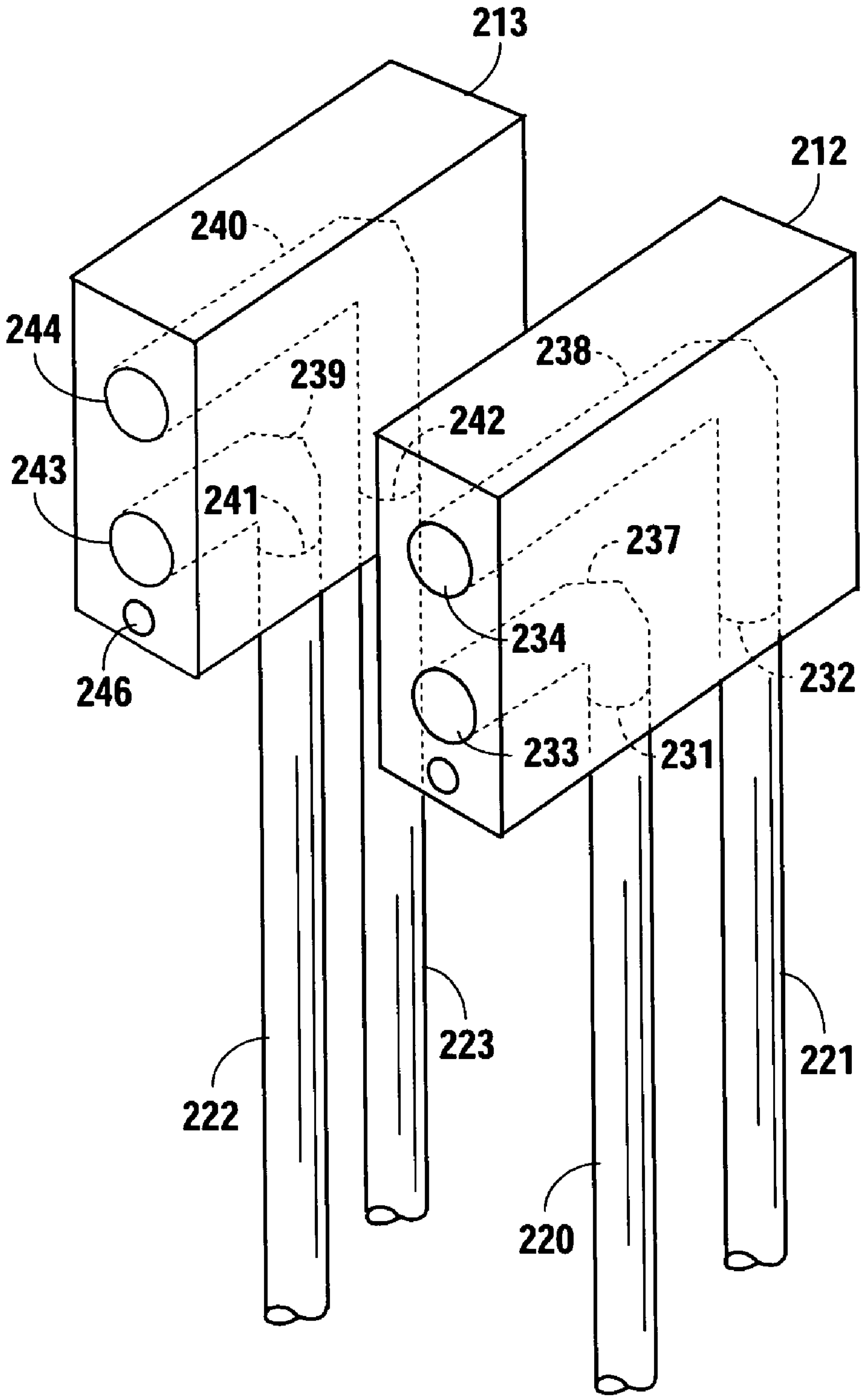
FIG. 8*b* provides an exploded view of two receiver blocks according to the second embodiment.

In a second embodiment, a dispenser 200 includes a receiver block and converter valve at multiple positions on a dispensing tower. As shown in FIGS. 8*a*-8*b*, the dispenser 200 includes a housing 201, and a tower section 210 disposed on the housing 201 in similar fashion to the first embodiment. The dispenser 200 further includes a faucet plate 227 secured to the tower section 210. The dispenser 200 further includes at least one diluent circuit 202, and at least two product circuits. As described in the first embodiment, the at least one diluent circuit 202 splits into a first branch 220 and a second branch 221. The first branch 220 passes through a conditioning device 208 for chilling, and the second branch 221 passes through the conditioning device 208 for chilling and a carbonating device 207 for carbonating. The first branch 220 connects to a first passage 237 of a first receiver block 212, and the second branch 221 connects to a second passage 238 of the first receiver block 212. The first passage 237 includes a first inlet 231 and a first outlet 233, and the second passage 238 includes a second inlet 232 and a second outlet 234. In similar fashion to the first embodiment, the first receiver block 212 is permanently secured to the first and second branches 220-221.

The second receiver block 213 is of a similar construction to the first receiver block 212, however, the feeding branches are concentrate circuits, and, therefore may be routed differently to provide varied product conditions, as well as varied product flavors. In this particular example, the product dispenser 200 includes a first product circuit 222 and a second product circuit 223 that pass through the conditioning device 208 in similar fashion to the first branch 220 of the diluent circuit 202. The first and second product circuits 222-223 are connected to separate product sources, and therefore may deliver a same product or different products. In this particular example, the first concentrate circuit 222 is connected to a first passage 239 of the second receiver block 213, and the second concentrate circuit 223 is connected to a second passage 240 of the second receiver block 213. The first passage 239 includes a first inlet 241 and a first outlet 243, and the second passage 240 includes a second inlet 242 and a second outlet 244.

The first and second receiver blocks 212-213 are disposed within the tower section 210 and in alignment with the respective insulator block reliefs 228-229, in similar fashion to the first embodiment. The receiver blocks 212-213 are then affixed in place. In this specific example, the receiver blocks 212-213 are foamed in place. Upon curing of the foam, the receiver blocks 212-213 are restrained and supported in their proper locations. While this particular example has been shown with foam support, one of ordinary skill in the art will recognize that mechanical fasteners may also be utilized. The product dispenser 200 further includes a clear passage through the insulation, as described in the first embodiment, to access the second engagement faces of the receiver blocks 212-213.

In this second embodiment, the faucet plate 227 includes at least a first insulation block relief 228 and a second insulation block relief 229. As in the first embodiment, the sizes and locations of the reliefs 228-229 are complementary to mating insulation blocks and a dispense point spacing on the faucet plate 227.

The dispenser 200 further includes at least one converter valve for each receiver block 212 or 213. The converter valves 214-215 are identical to those disclosed in the first embodiment, and include first through third ports 149-151, a passage 155 disposed between the first and second ports 149-150, and a plug 156 in communication with the third port 151. Illustratively, in this particular example, the second port 150 of the first converter valve 214 is connected to the first outlet 233 of the first receiver block 212, thereby extending the first branch 220 to the passage 155 of the converter valve 214. The third port 151 of the first converter valve 214 is connected to the second outlet 234, thereby plugging the second branch 221 at the plug 156 of the converter valve 214. Likewise, the second port 150 of the second converter valve 215 is connected to the first outlet 243 of the second receiver block 213, thereby extending the first concentrate circuit 222 to the passage 155 of the second converter valve 215. The third port 151 of the second converter valve 215 is connected to the second outlet 244 of the second receiver block 213, thereby plugging the second concentrate circuit 223 at the plug 156 of the second converter valve 215.

The dispenser 200 further includes an insulator block 216 disposed over the first converter valve 214, and a second insulator block 217 disposed over the second converter valve 215. As in the first embodiment, the insulator blocks 216-217 fit within the reliefs 228-229 of the faucet plate 227, thereby providing insulative properties to the converter valves 214 and 215. The first ports 149 of the converter valves 214-215 extend through the faucet plate 227, in similar fashion to the first embodiment, such that the first ports 149 connect to inlets of a back block 204.

In this second embodiment, the back block 204 includes dual passages, and, accordingly, includes a first inlet 261 in communication with a first outlet 263, and a second inlet 262 in communication with a second outlet 264. The back block 204 further includes apertures 266-267 for accepting suitable restraint fasteners, as described in the first embodiment, that secure to either the respective receiver blocks 212 or 213, the faucet plate 227, or any other suitable structure. In this particular example, at least one fastener pair passes through the mounting apertures 267, the faucet plate 227, and secures to restraint apertures 246 disposed on the second engagement face of the receiver blocks 212-213. A second fastener pair passes through the mounting apertures 266 and secures to restraint aperture 292 disposed in the faucet plate 227. Upon tightening of the fasteners, the back block 204 is secured to the receiver blocks 212-213, thereby capturing the first and second converter valves 214-215 in place. The dispenser 200 still further includes a dispense point 205 mounted onto the back block 204. In this particular example, the dispense point 205 is a product valve for mixing a concentrate with a diluent, and may dispense either a finished product, or an unfinished product for mixing exterior to the dispense point 205.

In use, a user must activate the dispense point 205 to allow product through the dispense point 205. Upon activation, conditioned diluent exits the conditioning device 108 and is delivered to the first passage of the first receiver block 212, through the passage 155 of the first converter valve 214 to the first inlet 261 of the back block 204. In similar fashion, the first concentrate moves through the conditioning device, is delivered to the first passage of the second receiver block 213, passes through the passage 155 of the second converter valve 215, and enters the second inlet 262 of the back block 204. Upon dispense point activation, the conditioned diluent and the first concentrate move to the dispense point for delivery, mixing, or any combination thereof. The first converter valve 214 may rotated in to the second position to extend the second branch 221 and plug the first branch 220, thereby delivering plain diluent to the back block 204 for mixing with the concentrate delivered to dispense point 205. Accordingly, the dispenser 200 is configured to deliver a plain diluent through the first branch 220 of the diluent circuit 202, and a first concentrate is delivered through the first concentrate circuit 222 for mixing with the diluent.

Alternatively, the dispenser 200 may be configured to deliver diluent from the second branch 221 by rotating the first converter valve 214, as described in the first embodiment, such that the second port 150 is connected to the second outlet 242 of the first receiver block 212, thereby placing the passage 155 of the second converter valve 214 in communication with the second branch 221. Substantially simultaneously, the third port 151 of the first converter valve 214 is connected to the first outlet 233 of the first receiver block 212, thereby plugging the first branch 220, when the first converter valve 214 is suitably restrained. Accordingly, the product dispenser 200 may deliver a fluid from either the first branch 220 or the second branch 221, dependent upon the desires of the operator.

The process of removing and reinstalling the first converter valve 214 is substantially identical to the process described in the first embodiment, and, therefore, will not be described in this second embodiment.

Alternatively, the second converter valve 215 may be rotated to move the second port 150 of the second converter valve 215 to the second outlet 244 of the second receiver block 213, and the third port 151 to the first outlet 243 of the second receiver block 213, thereby extending the second concentrate circuit 223 to the dispense point 205 for mixing with the diluent of choice. In similar fashion to the first converter valve 214, the third port 151 connects to the second outlet 244 of the second receiver block 213 and plugs the first concentrate circuit 222 when suitably restrained.

In a second alternative configuration, both converter valves 214-215 may be rotated to extend the second branch 221 of the diluent circuit 202, and the second concentrate circuit 223, thereby delivering carbonated diluent with the concentrate disposed within the second concentrate circuit 223.

Figure 9A:
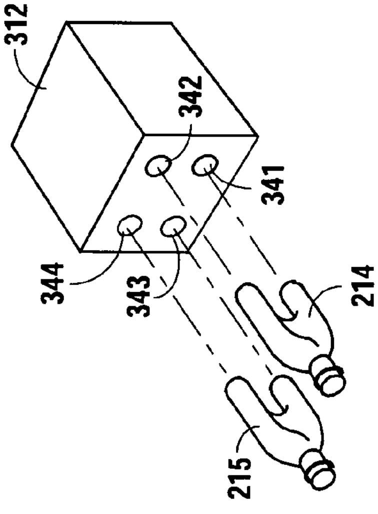
FIG. 9*a* provides a perspective view of a receiver block including passages for multiple converter valves according to an extension of the second embodiment.
Figure 9B:
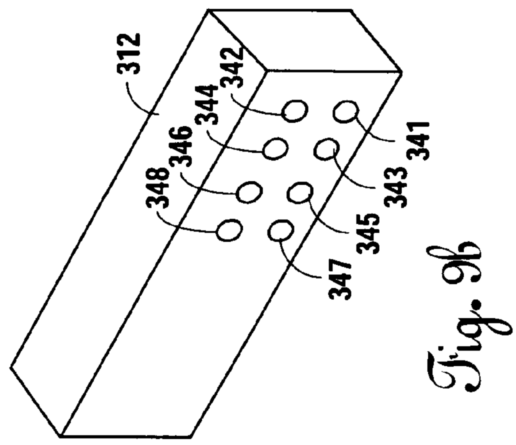
FIG. 9*b* provides a perspective view of a receiver block including passages for multiple converter valves according to the extension of the second embodiment.

While the second embodiment has been shown with individual receiver blocks 212 and 213 for each converter valve 214 and 215, one of ordinary skill in the art will recognize that the receiver blocks may be combined into a single receiver block 312 that receives multiple converter valves 214 and 215. As shown in FIG. 9*a*, receiver block 312 includes first through fourth passages 341-344 for delivery of first through fourth fluids from first through fourth fluid sources, respectively. Receiver block 312 may further include an increased number of passages to accommodate an increased number of converter valves. As shown in FIG. 9*b*, the receiver block 312 includes first through eighth passages 341-348 that may be connected to eight fluid sources. One of ordinary skill in the art will recognize that this design is modular, and the increased number of passages may be adaptable to a like increased number of fluid sources, or the passages may be connected to additional fluid sources at a point later than the installation of the product dispenser.

Figure 9C:
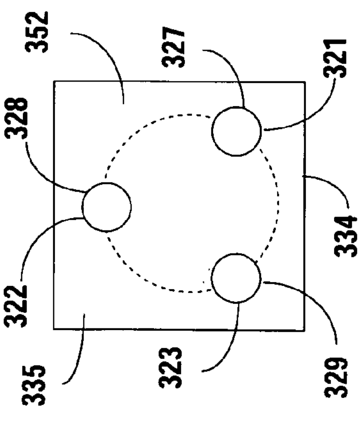
FIG. 9*c* provides a perspective view of a receiver block including passages in an alternative arrangement according to a second extension of the second embodiment.
Figure 9D:
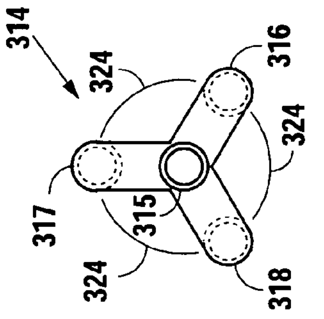
FIG. 9*d* provides a front view of a converter valve including ports angularly disposed about a first port according to a third embodiment.
Figure 9E:
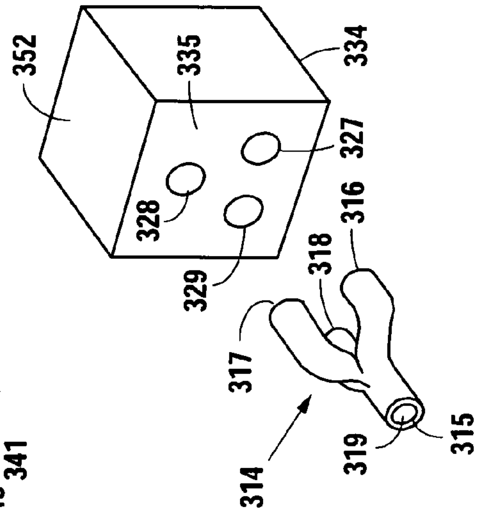
FIG. 9*e* provides an exploded view of a receiver block and a converter valve according to the third embodiment.

While the first and second embodiments have been shown with a converter valve 214 having first through third ports, one of ordinary skill in the art will recognize that the arrangement of the outlets may be of alternate configurations, including circular patterns. As shown in FIG. 9*c*, a receiver block 352, of virtually any workable shape, includes a first engagement face 334 and a second engagement face 335, and first through third passages 321-323 having outlets 327-329 disposed in a circular array. In similar fashion to the first and second embodiments, the first through third passages 321-323 are connectable to first through third fluid sources. In this extension of the first embodiment, as shown in FIGS. 9*d*-9*e*, a converter valve 314 includes a first port 315, a second port 316, a third port 317, and a fourth port 318. As described in the first embodiment, the first port 315 and the second port 316 are fluidly connected through a passage 319, and the third and fourth ports 317-318 are fluidly plugged. As such, in this configuration, only a fluid connected to first and second ports 315-316 flows through the converter valve 314. The second through fourth ports 316-318 are disposed about an axis of the first port 315 and at an angle 324, such that the converter valve 314 may be rotated about the axis of the first port 315 to move from a first position (second port 316 to first passage 321) to a second position (second port 316 to the second passage 322), thereby moving the passage 319 of the converter valve 314 into alignment with the second passage 322 of the receiver block 352. While this converter valve 314 has been shown with second through fourth ports 316-318 disposed at an angle 324, one of ordinary skill in the art will recognize that virtually any number of ports evenly distributed around the first port is possible, as long as a complementary number of passages are disposed in an arrangement complementary to the number of ports. In alternative configurations, the first and second ports 315-316 will be fluidly connected through a passage 319, and the remaining ports are plugged. One of ordinary skill in the art will further recognize that virtually any radius and spacing may be utilized, provided all remaining passages are plugged upon insertion of an alternative converter valve into the alternative receiver block. One of ordinary skill in the art will further recognize that additional outlet circles may be disposed around the first port at other radii, thereby providing additional outlet rings.

One of ordinary skill in the art will recognize that a multitude of combinations are possible, and should be construed as part of this invention, including a single dispense point dispenser being fed by a single receiver block and converter valve, whereby the dispenser delivers from one of two product circuits. One of ordinary skill in the art will further recognize that the dispenser 200 may be outfitted with increased quantities of converter valves, a mixture of receiver block and product outlets disposed on the faucet plate, and the like.

Although the present invention has been described in terms of the foregoing preferred embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing detailed description; rather, it is defined only by the claims that follow.

We claim:

1. A converter valve, comprising:

a body including a first port adapted to deliver fluid from the body, a second port adapted for coupling with a first fluid source, and a third port adapted for coupling with a second fluid source;

the body defining a passage disposed between the first port and the second port for delivering the first fluid from the first fluid source;

the body further defining a plug in fluid communication with the third port for blocking the delivery of the second fluid from the second fluid source; and the body being rotatable about the first port to change the locations of the second and third ports, thereby placing the passage in fluid communication with the second fluid source to deliver the second fluid to the first port, and blocking the flow of the first fluid from the first fluid source.

2. The converter valve according to claim 1, wherein the first port of the converter valve is in fluid communication with a dispense point for delivery of the fluid disposed within passage of the converter valve.

3. The converter valve according to claim 1, wherein the plug is a wall separating the third port from the first and second ports.

4. The converter valve according to claim 1, wherein the first port is disposed on a first end of the body, and the second and third ports are disposed on a second end of the body.

5. The converter valve according to claim 4, wherein the second and third ports are symmetrically disposed from the first port, thereby allowing rotation about the first port.

6. The converter valve according to claim 4, further comprising:

a fourth port disposed on the second end of the body, wherein the fourth port is adapted for coupling with a third fluid source; and a plug in fluid communication with the fourth port for blocking the delivery of the third fluid from the third fluid source.

7. The converter valve according to claim 1, further comprising:

at least one additional port disposed on the body, wherein the at least one additional port is in fluid communication with a plug.

8. The converter valve according to claim 6, wherein the second through fourth ports are evenly disposed at a radial distance about the first port, thereby allowing rotation of the body and reconnection to a next desired port.

9. The converter valve according to claim 1, further comprising:

a first marker disposed in proximity to the first port; and a second marker disposed in proximity to the second port to visually inform an operator of a present location of the passage when the converter valve is in an installed position.

10. An apparatus, comprising:

a receiver block including a first passage receiving a first fluid from a first fluid source, and a second passage receiving a second fluid from a second fluid source;

a body including a first port adapted to deliver fluid from the body, a second port adapted for coupling with the first passage of the receiver block, and a third port adapted for coupling with the second passage of the receiver block;

the body defining a passage disposed between the first port and the second port for delivering the first fluid from the first fluid source to a dispense point in fluid communication with the first port;

the body further defining a plug in fluid communication with the third port for blocking the delivery of the second fluid from the second fluid source; and the body being rotatable about the first port to change the locations of the second and third ports, thereby placing the passage of the body in fluid communication with the second passage of the receiver block to deliver the second fluid to the first port and the dispense point, and blocking the flow of the first fluid from the first passage of the receiver block.

11. The apparatus according to claim 10, wherein the first port is disposed on a first end of the body, and the second and third ports are disposed on a second end of the body.

12. The apparatus according to claim 11, wherein the second and third ports are symmetrically disposed from the first port, thereby allowing rotation of the body about the first port.

13. The apparatus according to claim 11, wherein the receiver block includes a third passage receiving a third fluid from a third fluid source, and a fourth passage receiving a fourth fluid from a fourth fluid source.

14. The apparatus according to claim 13, further comprising:

a second body including a first port adapted to deliver fluid from the second body, a second port adapted for coupling with the third passage of the receiver block, and a third port adapted for coupling with the fourth passage of the receiver block;

the second body defining a passage disposed between the first port and the second port for delivering the third fluid from the third fluid source to a second dispense point in fluid communication with the first port;

the second body further defining a plug in fluid communication with the third port for blocking the delivery of the fourth fluid from the fourth fluid source; and the second body being rotatable about the first port to change the locations of the second and third ports, thereby placing the passage of the second body in fluid communication with the fourth passage of the receiver block to deliver the fourth fluid to the first port and the second dispense point, and blocking the flow of the third fluid from the third passage of the receiver block.

15. The apparatus according to claim 11, further comprising:

a fourth port disposed on the second end of the body wherein the second through fourth ports are radially disposed about the first port, thereby allowing rotation of the body about the first port.

16. The apparatus according to claim 15, wherein the receiver block includes a third passage having an inlet and an outlet, and further wherein outlets of the first through third passages are disposed in a circular pattern of a shape complementary to the arrangement of the second through fourth ports of the body.

17. The apparatus according to claim 10, further comprising:

at least one additional passage disposed within the receiver block, wherein an outlet of the at least one additional passage is disposed in a predetermined arrangement of the outlets of the first and second passages.

18. The apparatus according to claim 17, further comprising:

at least one additional port disposed on the second end of the body, wherein the at least one additional port is in fluid communication with a plug, and further wherein the at least one additional port is disposed in a predetermined arrangement, thereby allowing rotation of the body and the engagement of all outlets upon insertion of the body into position.

19. A dispenser, comprising:

a housing including a first fluid circuit containing a first fluid, a second fluid circuit containing a second fluid, and a dispense point for delivering a fluid from the housing; and a converter valve disposed within the housing, wherein the converter valve includes a passage in communication with the first fluid circuit for delivering the first fluid from the first fluid circuit and to the dispense point, and a plug in communication with the second fluid circuit for blocking the delivery of the second fluid from the second fluid circuit, and further wherein the converter valve is rotatable to align the passage in fluid communication with the second fluid circuit and the plug in fluid communication with the first fluid circuit, thereby delivering the second fluid to the dispense point and blocking the flow of the first fluid at the plug.

20. The dispenser according to claim 19, wherein the first fluid is a plain diluent.

21. The dispenser according to claim 20, wherein the second fluid is a carbonated diluent.

22. The dispenser according to claim 21, further comprising:

a first concentrate circuit disposed within the housing, wherein the first concentrate circuit delivers a first concentrate from a first concentrate source;

a second concentrate circuit disposed within the housing, wherein the second concentrate circuit delivers a second concentrate from a second concentrate source; and a second converter valve disposed within the housing, wherein the second converter valve includes a passage in communication with the first concentrate circuit for delivering the first concentrate from the first concentrate source to the dispense point, and a plug in communication with the second concentrate circuit for blocking the delivery of the second concentrate from the second concentrate source, and further wherein the converter valve is rotatable to align the passage in fluid communication with the second concentrate circuit and the plug in fluid communication with the first concentrate circuit, thereby blocking the flow of the first concentrate at the plug, and delivering the second concentrate to the dispense point for mixing with fluid from the first or second fluid circuits.

23. The dispenser according to claim 22, further comprising a receiver block including first through fourth passages for receiving the first and second fluid circuits and the first and second concentrate circuits.

24. The dispenser according to claim 23, wherein the receiver block also receives the first and second converter valves.

25. A dispenser, comprising:

a housing;

a receiver block disposed within the housing, wherein the receiver block includes a first passage in communication with a first fluid source and a second passage in fluid communication with a second fluid source;

a converter valve disposed within the housing, wherein the converter valve includes a first port for delivering fluid, a second port in fluid communication with the first passage of the receiver block and a third port in fluid communication with the second passage of the receiver block, and further wherein the converter valve includes a passage disposed between the first and second ports to deliver a first fluid to the first port, and a plug in fluid communication with the third port to block the flow of a second fluid from the second fluid source; and a back block in fluid communication with the first port, wherein the back block is secured to the receiver block, thereby capturing the converter valve between the back block and the receiver block, and further wherein the converter valve is rotatable to align the second port in fluid communication with the second passage of the receiver block to deliver the second fluid to the back block and the third port in fluid communication with the first passage to block the flow of the first fluid from the first fluid source.

26. The dispenser according to claim 25, further comprising:

dispense point disposed within the housing, wherein an inlet of the dispense point is in fluid communication with an outlet of the back block, to receive fluid from the passage of the converter valve and dispense the fluid for use.

27. The dispenser according to claim 25, wherein the back block is further secured to a faucet plate.

28. The dispenser according to claim 27, wherein the first port of the converter valve protrudes through the faucet plate to couple with the back block.

29. The dispenser according to claim 25, further comprising:

a second receiver block disposed adjacent to the first receiver block, wherein the second receiver block includes a first passage in communication with a first concentrate source and a second passage in fluid communication with a second concentrate source.

30. The dispenser according to claim 29, further comprising:

a second converter valve disposed within the housing, wherein the second converter valve includes a first port for delivering fluid, a second port in fluid communication with the first passage of the second receiver block and a third port in fluid communication with the second passage of the second receiver block, and further wherein the second converter valve includes a passage disposed between the first and second ports to deliver a first concentrate to the first port, and a plug in fluid communication with the third port to block the flow of a second concentrate from the second concentrate source.

31. The dispenser according to claim 30, further comprising:

a second back block in fluid communication with the first port of the second converter valve, wherein the second back block is secured to the second receiver block, thereby capturing the second converter valve between the second back block and the second receiver block, and further wherein the second converter valve is rotatable to align the second port in fluid communication with the second passage of the second receiver block to deliver the second concentrate to the second back block and the third port in fluid communication with the first passage of the second receiver block to block the flow of the first concentrate from the first concentrate source.

32. The dispenser according to claim 31, wherein the dispense point includes a second inlet in fluid communication with the first port of the second converter valve, and receives concentrate from the passage of the second converter valve for mixing with the fluid from the passage of the first converter valve.

33. The dispenser according to claim 25, further comprising:

at least one additional passage disposed within the receiver block, wherein an outlet of the at least one additional passage is disposed in a predetermined arrangement of the outlets of the first and second passages.

34. The dispenser according to claim 33, further comprising:

at least one additional port disposed on the converter valve, wherein the at least one additional port is in fluid communication with a plug, and further wherein the at least one additional port is disposed in a predetermined arrangement with the second and third ports, thereby allowing rotation of the body and the reinsertion of the second, third and at least one additional port into receiver block outlets.

35. A method of changing product lines delivering product to a dispense point, comprising:

a. providing a dispenser including a first fluid circuit and a second fluid circuit;

b. providing a converter valve including a passage disposed between a first port and a second port of the converter valve, and a plug in fluid communication with a third port;

c. placing the converter valve into the dispenser such that the passage is in fluid communication with the first fluid circuit and the third port is in fluid communication with the second fluid circuit, thereby delivering a first fluid from the first fluid circuit to a dispense point in fluid communication with the first port, and blocking a flow of a second fluid from the second fluid circuit;

d. removing the converter valve from the dispenser;

e. rotating the converter valve about an axis of the first port; and f. reinstalling the converter valve in the rotated position, such that the second port is in fluid communication with the second fluid circuit to deliver the second fluid from the second fluid circuit, and the third port is in fluid communication with the first fluid circuit, thereby delivering the second fluid from the second fluid circuit to the dispense point and blocking the flow of the first fluid from the first fluid circuit.

36. A method of changing a product delivered to a dispense point, comprising:

a. providing a receiver block including a first passage and a second passage, wherein the first passage is in fluid communication with a first fluid circuit and the second passage is in fluid communication with a second fluid circuit;

b. providing a converter valve including a passage disposed between a first port and a second port of the converter valve, and a plug in fluid communication with a third port, wherein the first port is in fluid communication with a dispense point;

c. placing the second port of the converter valve into fluid communication with the first passage of the receiver block, thereby extending the first fluid circuit through the passage of the converter valve to the dispense point, and placing the third port of the converter valve into fluid communication with the second passage of the receiver block, thereby blocking the second fluid circuit at the plug;

d. removing the converter valve from the receiver block;

e. reinstalling the converter valve such that the second port is in fluid communication with the second passage of the receiver block and the third port is in fluid communication with the second passage of the receiver block, thereby extending the second fluid circuit to the dispense point, and blocking the first fluid circuit.

* * * * *